United States Patent
Noman et al.

(10) Patent No.: US 10,141,865 B1
(45) Date of Patent: Nov. 27, 2018

(54) HYBRID CHB-TVSI MULTILEVEL VOLTAGE SOURCE INVERTER

(71) Applicant: KING SAUD UNIVERSITY, Riyadh (SA)

(72) Inventors: Abdullah Mohammed Ali Noman, Riyadh (SA); Abdulraman Abdullah Alshammaa, Riyadh (SA); Khaled Ebraheem Addoweesh, Riyadh (SA); Ayman Abdullah Abdulaziz Alabduljabbar, Riyadh (SA); Abdulrahman Ibrahim Alolah, Riyadh (SA)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 15/823,192

(22) Filed: Nov. 27, 2017

(51) Int. Cl.
*H02M 7/483* (2007.01)
*H02M 7/5387* (2007.01)
*H02M 1/00* (2006.01)

(52) U.S. Cl.
CPC ....... *H02M 7/483* (2013.01); *H02M 7/53871* (2013.01); *H02M 2001/007* (2013.01)

(58) Field of Classification Search
CPC ............. H02M 7/483; H02M 7/53871; H02M 2001/007
See application file for complete search history.

(56) References Cited

U.S. PATENT DOCUMENTS

| | | | |
|---|---|---|---|
| 6,697,371 | B1 | 2/2004 | Corzine |
| 6,969,967 | B2 * | 11/2005 | Su .......................... H02M 7/487 318/801 |
| 7,830,687 | B2 | 11/2010 | Du et al. |

FOREIGN PATENT DOCUMENTS

| | | |
|---|---|---|
| CN | 101494425 | 7/2009 |
| CN | 103401462 | 11/2013 |

* cited by examiner

*Primary Examiner* — Emily P Pham
(74) *Attorney, Agent, or Firm* — Richard C. Litman

(57) ABSTRACT

The hybrid CHB-TVSI multilevel voltage source inverter is a polyphase grid-connected multilevel inverter system has an upper part and lower part that provides output power in three phases. The upper part uses cascaded H-bridge cells having pairs of switched intermediate outputs. DC power sources are connected in series or parallel to track a desired input voltage to feed respective H-bridges, providing an optimum power point tracking (MPPT) of the DC power sources. The lower part, also connected to DC power sources, uses a triple voltage source multilevel inverter that includes three cascaded units, each configured as a three-leg, two-level inverter. The lower part is connected to the upper part, the upper part providing a corresponding polyphase output.

13 Claims, 14 Drawing Sheets

HYBRID CHB-TVSI MULTILEVEL VOLTAGE SOURCE INVERTER

BACKGROUND

1. Field

The disclosure of the present application relates to electrical power derived from renewable energy sources (such as solar power and wind power), and in particular to a hybrid CHB-TVSI multilevel voltage source inverter that combines a cascaded H-bridge (CHB) multilevel inverter (MLI) with a three-phase voltage source inverter (TVSI) to connect multiple DC sources to an electrical grid.

2. Description of the Related Art

The most important device in the grid-connected systems is the inverter. The inverter can be classified according to the number of voltage levels generated into two groups, the two-level inverter and the multilevel inverter (MLI). In the recent years, many multilevel converter topologies have been proposed and gained attention in many applications, especially in the interface for grid connection of PV system applications. The most common MLI topologies can be classified into three types, viz., neutral point MLI, flying capacitor MLI, and cascaded H-bridge. A three-level neutral point clamping topology was implemented as far back as 1981. Four, five, and six levels have been proposed for use in static VAR compensation, variable speed motor drives, and high voltage system interconnections. The neutral point clamping converter (NPC) has many advantages, such as that the voltage can be shared between switches, smaller output current ripples, a plentiful supply of IGBT modules for a leg or the whole of the NPC inverter in the market, and that the topology does not need isolated DC sources. The NPC also have some disadvantages, such as an increase in the number of clamping diodes with an increasing number of levels, which makes the inverter bulky. In addition, increasing the number of levels leads to an increase in diode losses. On the other hand, the clamping diodes require different voltage ratings for reverse recovery blocking.

The flying capacitor (FC) multilevel topology is considered an alternative to the NPC topology, with capacitor MLI also proposed. Flying capacitor topology is similar to NPC topology, except that capacitors are added instead of diodes. The FC MLI provides many advantages over the NPC, such as eliminating the clamping diodes presented in the NPC, and there is no need for filters due to the presence of capacitors. However, with an increase in the number of levels, control of charging and discharging the capacitors of the FC MLI will not be easy, and the cost will increase. In addition, this topology needs more capacitors compared with NPC, and it will be bulky with increasing the number of levels.

Although MMC topologies have received more attention in many applications, the technology has some drawbacks. In MMC, losses are not evenly distributed among switches of submodules of the MMC arms. This property of MMC topology is not related to the modulation technique used. On the other hand, in the case of cascaded H-bridge MLI, using phase shift pulse width modulation PWM (PSPWM) modulation technique causes equal sharing of losses among different switches. Unequal sharing of losses among MMC switches results in unequal junction temperature, and this will cause the need for using higher IGBTs rating. From another point of view, MMC needs much more installed capacitance in comparison to the CHB, and this is one of the main drawbacks of the MMC topology. Another main drawback of MMC is that it needs a higher number of switches compared to a CHB inverter. It is known that inherent reliability of a converter is inversely related to the number of components in the converter. This is because as the number of components increases, the chance of failure in components correspondingly increases. From this point of view, due to the MMC requirement for a higher number of switches, its reliability decreases.

Maximum power point tracking (MPPT) uses a maximum power point (MPP) in order to track certain types of power sources, such as photovoltaic (PV) modules, in order to maintain optimum power output. MPPT is often used to optimize power output of the PV modules and apply the optimum power output from the PV modules to an inverter.

Examples of multi-layer inverters are shown in FIGS. 1-7. FIG. 1 is a schematic diagram showing a prior art three-phase, five-level cascaded H-bridge multilevel inverter. FIG. 2 is a schematic diagram showing a prior art hybrid multilevel inverter topology. FIG. 3 is a schematic diagram showing a prior art nine-level hybrid multilevel inverter topology. FIG. 4 is a schematic diagram that shows a prior art modular multilevel inverter topology. FIG. 5 is a schematic diagram showing a prior art new topology based on modular multilevel inverter topology. FIG. 6 is a schematic diagram showing a hybrid topology based on a modular multilevel inverter and a conventional two-level inverter.

Another interesting type of cascaded MLI topology is based on the conventional two-level voltage source inverter and has attractive features in many applications, especially for motor drive applications. This cascaded MLI can also be used for grid-connected renewable energy applications. One technique uses this topology to connect a wind farm to the grid. Another technique uses the multilevel VSI cascaded inverter for grid-connected PV applications, as shown in FIG. 7. The limitations in this triple cascaded VSI is that it is not possible to increase the number of cascaded inverter units more than three, and therefore the number of levels will be limited.

Thus, a hybrid CHB-TVSI multilevel voltage source inverter solving the aforementioned problems is desired.

SUMMARY

The hybrid CHB-TVSI multilevel voltage source inverter is configured with an upper part and a lower part. The upper part includes a set of pairs of H-bridge cells having pairs of x-side and y-side switched intermediate outputs, the cells being cascaded such that a terminal between the y-side switched intermediate output on one side of the first H-bridge cell connects with a terminal between the x-side switched intermediate output of the second H-bridge cell, and a terminal between the y-side switched intermediate output on one side of the second H-bridge cell connects with a terminal between the x-side switched intermediate output of the next H-bridge cell. The respective H-bridges in the upper part are connected to one or more DC power sources, which are connected in series or parallel to track a desired input voltage to feed the respective H-bridge. The H-bridge cells have a first set of outputs connected to each other, and a second set of outputs provide output power in respective phases. In one configuration the second set of outputs provides output power to a first set of primary winding connections on respective phases of the set of output transformers.

A lower part includes a polyphase voltage source inverter having a number of phases corresponding to the number of phases in the upper part, such as three phases. The lower part includes a number of units corresponding to the phases and connected to one or more DC power sources. Each of the units is provided as a three-leg, two-level inverter connected in cascade, each unit having three output terminals. Two of the output terminals of the units in the lower part are connected to respective output terminals of other units of the lower part, and one of the output terminals of the units in the lower part is connected to the upper part. The connections of the upper and lower parts connect respective phases of the upper part to corresponding phases of the lower part.

In one configuration the inverter system is configured as three-phase. In some configurations, the upper and lower phases are linked through inductive couplings, and in other configurations, the upper and lower phases are directly connected.

These and other features of the present disclosure will become readily apparent upon further review of the following specification and drawings.

BRIEF DESCRIPTION OF THE DRAWINGS

FIG. 10 is a schematic diagram of the cascaded H-bridge inverter, in phase a.

Similar reference characters denote corresponding features consistently throughout the attached drawings.

DETAILED DESCRIPTION OF THE PREFERRED EMBODIMENTS

Figure 1:
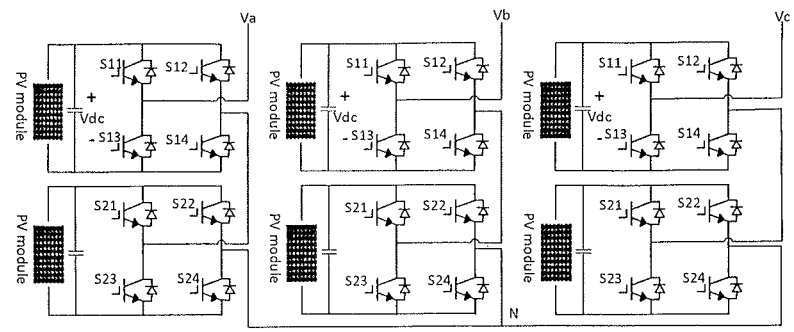
FIG. 1 is a schematic diagram of a three-phase, five-level cascaded H-bridge multilevel inverter of the prior art.
Figure 2:
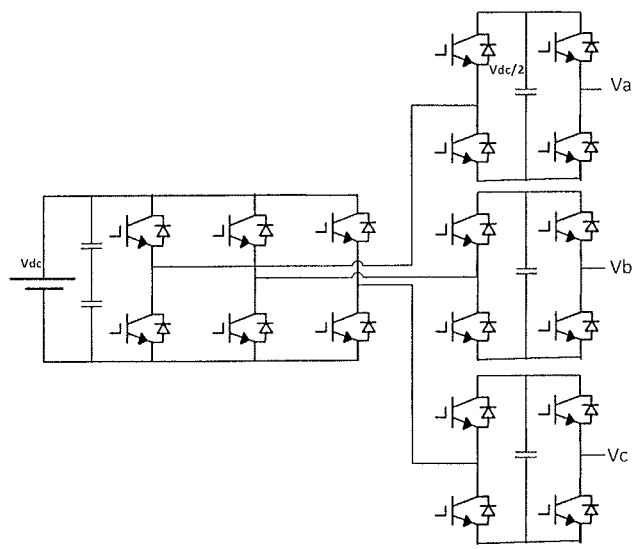
FIG. 2 is a schematic diagram of a hybrid multilevel inverter topology of the prior art.
Figure 3:
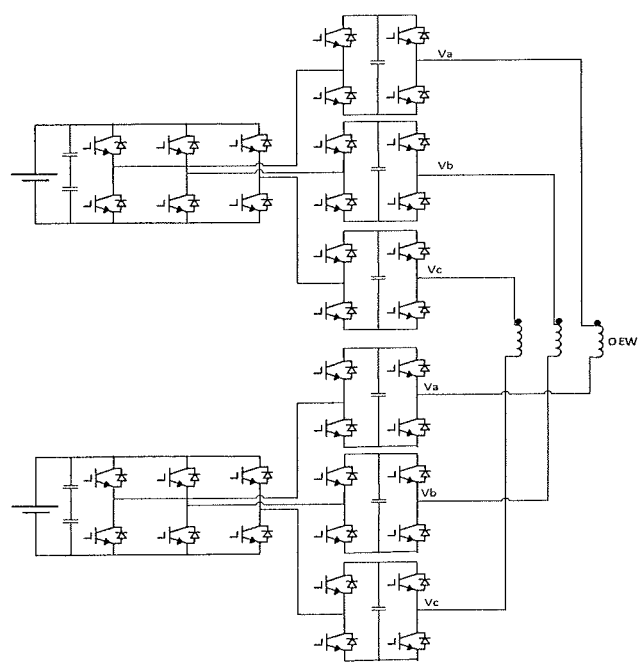
FIG. 3 is a schematic diagram of a nine-level hybrid multilevel inverter topology of the prior art.
Figure 4:
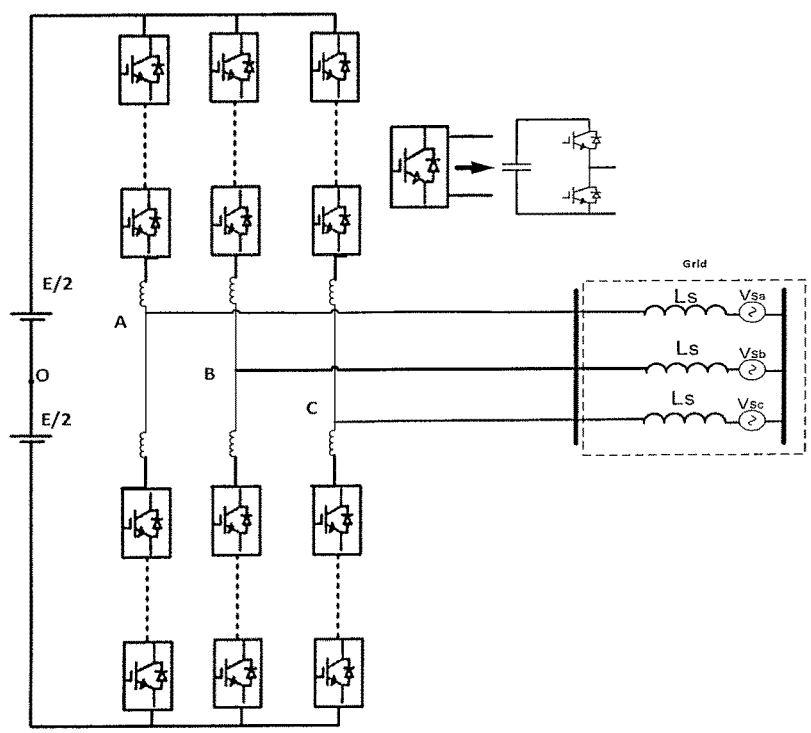
FIG. 4 is a schematic diagram of a modular multilevel inverter topology of the prior art.
Figure 5:
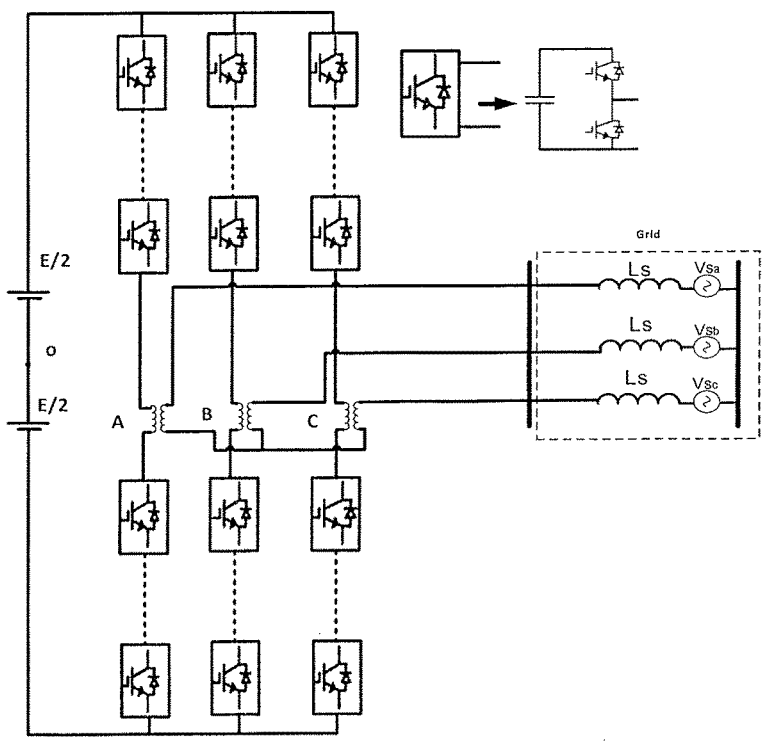
FIG. 5 is a schematic diagram of a new topology of the prior art based on modular multilevel inverter topology.
Figure 6:
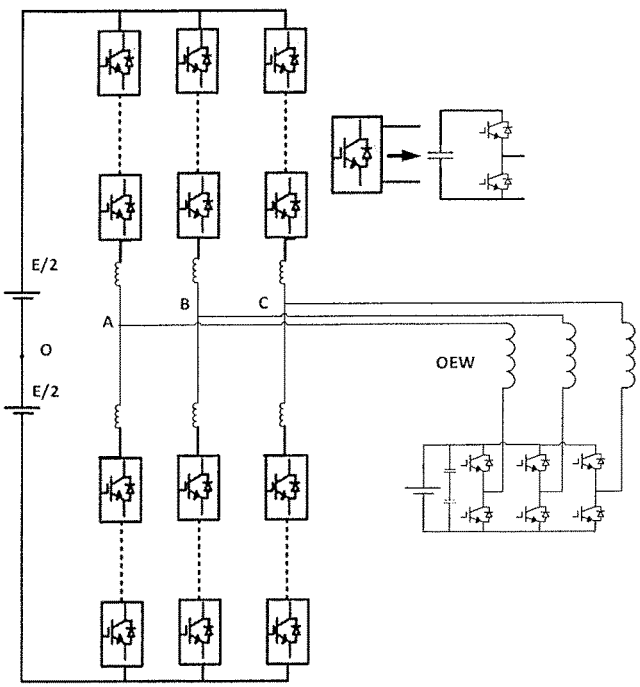
FIG. 6 is a schematic diagram of a hybrid topology of the prior art based on modular multilevel inverter and conventional two-level inverter.
Figure 7:
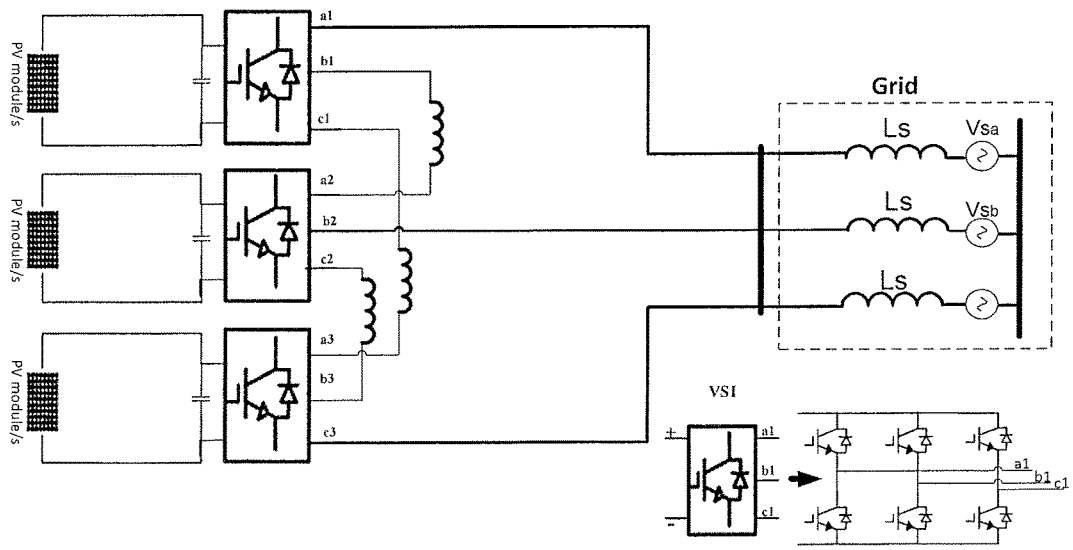
FIG. 7 is a schematic diagram of a cascaded three-phase triple voltage source inverter topology of the prior art.

The hybrid CHB-TVSI multilevel voltage source inverter is a grid-connected multilevel inverter topology that can be used for different applications.

The disclosed subject matter introduces a combination of cascaded H-bridge multilevel inverter with a cascaded three-phase voltage source inverter, the latter also called a three-phase triple voltage source inverter (TVSI). This combination increases the number of voltage levels generated using a lower component count compared as to the conventional multilevel inverter topologies for the same voltage levels generated. This configuration also assures a continuous power supply to the grid in case of failure of one part in the disclosed configuration. Also, in the instance of a grid fault, the three-phase VSI unit part can be isolated from the grid and the cascaded H-bridge MLI part stills works at lower voltage levels to reduce the fault current shared from the inverter system.

In an alternate topology, the cascaded H-bridge units (upper part) are directly connected to the corresponding phase in the three-phase triple VSI units (lower part). The direct connection topology is introduced in order to improve system performance and reduce the system cost. The number of voltage levels generated from the extension topology is also higher while using a lower number of component compared to the other conventional MLI topologies to generate the same voltage levels. Both topologies are built in MATLAB/SIMULINK environment. Simulation results and comparisons are presented to validate the disclosed topologies.

The disclosure focuses on a multilevel inverter topology for grid-connected applications, and in particular connecting PV (photovoltaic) systems to a grid PV system. Among different topologies of multilevel converters described above, cascaded H-bridge topologies have received more attention. The cascaded H-bridge inverter has a simple layout, extreme modularity, is easy in construction and control, has reduced voltage balance problems, and compared to the other multilevel topologies, requires the least number of components to generate the same voltage levels. The cascaded H-bridge MLI is an attractive approach for a grid-connected PV system. DC sources can be replaced by a PV module/array, and due to the separated DC link feature, voltage control becomes possible. Thus, individual maximum power point tracking (MPPT) control in each module can be achieved, and the total power extracted from PV panels will be maximized, so that efficiency improves.

A cascaded H-bridge multilevel inverter (CHB MLI) is based on series connection of H-bridge cells. It is an alternative topology with a lower number of components compared with the other MLI topologies of the same level.

Each H-bridge cell can be used to generate three voltage levels by unipolar modulation technique. Each H-bridge cell has a separated DC source. Cascaded H-bridge MLI topology has the least number of components in comparison with other topologies at the same level, ease of control, no voltage balancing problem, ease of construction, reliable and low inverter cost. The cascaded MLI features presents an attractive approach for many applications, such as use CHB MLI in standalone systems, some of the in static VAR compensations, and some of them use CHB MLI in grid-connected PV system. Cascaded H-bridge multilevel inverter requires an isolated DC source for each H-bridge. Therefore, a combination of the multiple H-bridge modules would favor this topology in medium and large grid-connected PV systems. CHB multilevel inverters also overcome some of the drawbacks inherent in MMC topologies.

MPPT control is particularly useful in PV modules. PV module behavior is not linear in nature as a result of the effects of environmental conditions, and hence exhibits nonlinear PV curves. There is only a single point in the nonlinear PV curve at which the power is maximum. Therefore, special methods have been used to track (follow and extract) this maximum power point (MPP). These methods are referred as maximum power point tracking (MPPT) techniques. Therefore, tracking means follow and extract the maximum power of the PV module.

MPPT in association with PV modules is achieved by connecting the PV modules to DC-DC converters. The voltage and the current of the PV module is then measured, and the power is calculated. The MPPT—as in the Perturb and Observe MPPT method—perturbs the voltage and observes the power to determine the change direction. If the power difference is positive, the direction of perturbation remains the same. Otherwise, it is reversed. Finally, the MPPT generates the required switching signal to drive the IGBTs of the DC-DC converters in order to keep operating the PV module at its maximum power.

If it is required to increase the number of levels in CHB-MLI in order to improve the voltage and current quality, the number of switches will likewise be increased. Increasing the number of switches leads to increased costs, and an increase in conduction and switching losses, hence reducing efficiency and reliability, and increasing complexity of the control system.

The hybrid CHB-TVSI multilevel voltage source inverter comprises two parts, which are connected together by open-end winding transformers. The topology is shown in shown in FIG. 8. For convenience in describing the Hybrid CHB-TVSI topology, the topology can be divided it into "upper" and "lower" parts. The upper part is the cascaded H-bridge MLI, and the lower part is the three-phase triple VSI.

Figure 9:
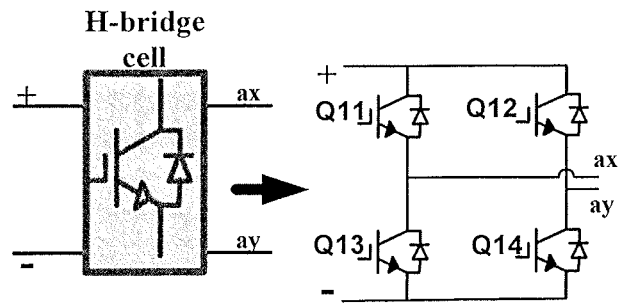
FIG. 9 is a schematic diagram of a single H-bridge cell used in the hybrid CHB-TVSI multilevel voltage source inverter of FIG. 8.
Figure 10:
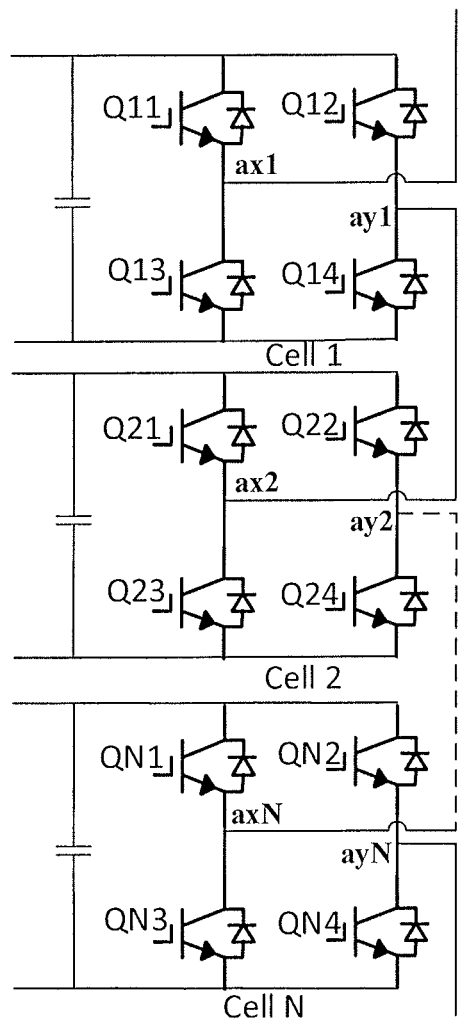
Figure 11:
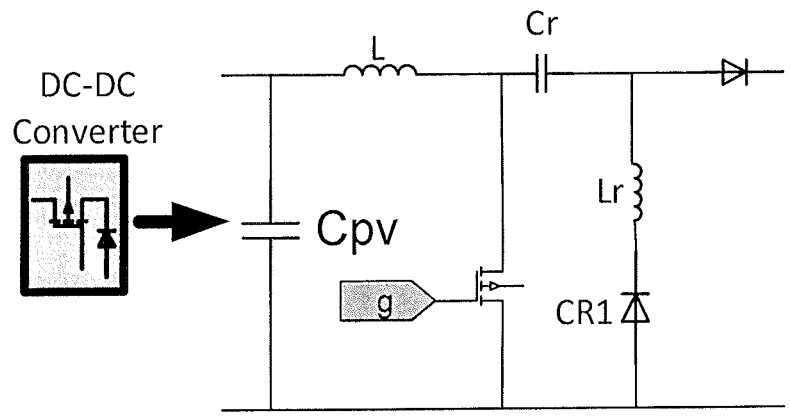
FIG. 11 is a schematic diagram of a DC-DC Ćuk converter.

The upper part is configured as a three-phase system. Each phase comprises N H-bridge cells. A single H-bridge cell is shown in FIG. 9. These cells are cascaded, as shown in FIG. 10, such that the $a_{y1}$ terminal of the H-bridge cell 1 in phase a, for example, is connected to the $a_{x2}$ terminal of the next H-bridge cell. In addition, the $a_{y(N-1)}$ terminal is connected to the $a_{xN}$ terminal of the last H-bridge cell. The same approach is applied to phases b and c. The terminals $a_{yN}$, $b_{yN}$ and $c_{yN}$ of phases a, b, and c are connected together to one point NN. From another point of view, the cascaded H-bridge is based on the AC module topology in which only one converter is used per module due the fact that the AC module topology is superior over the other types, since it is the most modular and has the best MPPT capability. Each H-bridge cell in the upper part is connected to n umber of PV modules via DC-DC converters. Each PV module is connected to one DC-DC converter. The output terminals of the DC-DC converters are then connected in series/parallel to obtain the desired input voltage/current level to feed the H-bridge cell. The reason of using one DC-DC converter per module is to track the maximum power for only one PV module. This helps in achieving the best MPPT of the PV modules. The DC-DC converter used here is the Ćuk converter, shown in FIG. 11.

Figure 12:
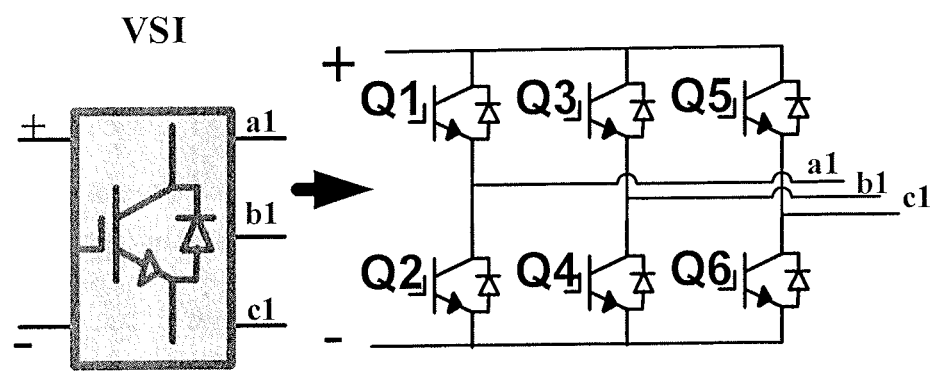
FIG. 12 is a schematic diagram of a three-phase, two-level VSI.

The lower part is configured as a three-phase system, corresponding to the number of phases in the upper part. The three-phase triple voltage source multilevel inverter comprises three units. Each unit is a three-leg, two-level inverter, as shown in FIG. 12. The three units are cascaded, as shown in the lower part of FIG. 8. Each unit comprises three terminals, where $a_{21}$, $b_{21}$, and $c_{21}$ are the output terminals of unit 1 and $a_{22}$, $b_{22}$, and $c_{22}$ are the output terminals of unit 2, while $a_{23}$, $b_{23}$, and $c_{23}$ are the output terminals of unit 3. The PV modules are connected to each VSI unit via a DC-DC converter.

The upper and the lower parts are connected in such a way that phase A of the upper configuration is connected to phase A of the lower configuration via open-end winding transformer, etc., for all phases. That is, in the case of the three-phase architecture, terminal $a_{x1}$ from the upper part is connected to the terminal $a_1$ of the open-end winding transformer $T_1$, while terminal $a_{21}$ of unit 1 in the lower part is connected to terminal $a_2$ of the open-end winding transformer $T_1$. In addition, the terminal $b_{x1}$ of the upper part is connected to the terminal $b_1$ of the open-end winding transformer $T_2$, while terminal $b_{22}$ of unit 2 in the lower part is connected to terminal $b_2$ of the open-end winding transformer $T_2$. In addition, terminal $c_{x1}$ of the upper part is connected to terminal $c_1$ of the open-end winding transformer $T_3$, while terminal $c_{23}$ of unit 3 in the lower part is connected to terminal $c_2$ of the open-end winding transformer $T_3$. The secondary windings of the transformers $T_1$, $T_2$ and $T_3$ are then connected to the three phase grid. Three single-phase line frequency transformers presented in the disclosed technique are used to connect the upper three-phase cascaded H-bridge inverter with the lower three-phase triple voltage source inverter. The operation of the three single-phase transformers is based on the principles of the open-end transformer.

In this configuration, (1) the voltage rating of the power devices is reduced by half; (2) the size of the capacitors is reduced; and (3) the DC bus magnitude that is provided by the PV modules can be reduced by half, as compared to if only one part (upper or lower) is used. This new topology generates a higher number of voltage levels while reducing the number of required switches, compared to conventional multilevel inverter topologies, to generate the same voltage levels. The reduction in the number of switches leads to reduced complexity and dimensions of the converter. In addition, the topology helps in reducing the THD of the voltages and currents. In case of failure in one part, the other part is working independently and power is still available. In addition, if it is required to increase the number of levels, the number of H-bridge cells in the upper part can be increased. The presented concept is validated by means of simulation results.

Thus, a high number of levels can be obtained while using a lower number of switches compared to the conventional multilevel inverter topologies for the same voltage levels generated; the topology provides improved voltage and current quality; and a continuous power supply to the grid in case of failure of one configuration is assured. Therefore, the disclosed topology is reliable. In addition there is reduced voltage stress on the switches. These stresses can be quantified by the following. Stresses on the upper switches are:

$$\frac{\sqrt{2}\,V}{2n\sqrt{3}}, \quad (1)$$

where V is the RMS line-line grid voltage and n is the number of cascaded H-bridges. The stresses on the lower switches are characterized by:

$$\frac{\sqrt{2}\,V}{2\sqrt{3}} \quad (2)$$

In the instance of a grid fault, the lower configuration can be isolated form the grid and the upper still working at lower voltage level to reduce the fault current sharing by the inverter system.

Figure 8:
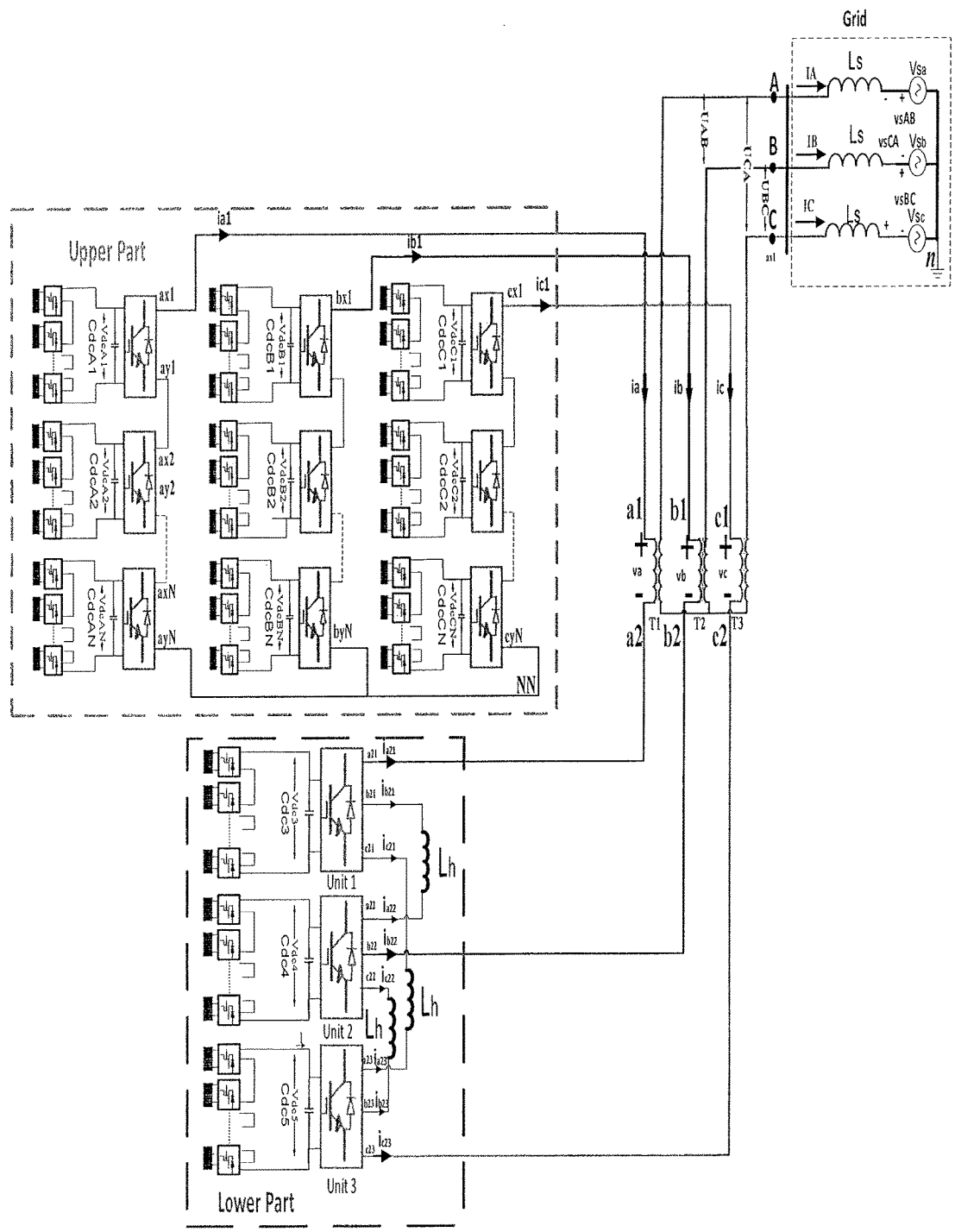
FIG. 8 is a schematic diagram of a hybrid CHB-TVSI multilevel voltage source inverter according to the present disclosure.

An initial analysis evaluates the voltage of the circuits at the primary side of the open-end winding transformers shown in FIG. 8. For phases a-b:

$$v_{ax1} - v_a - v_{a21b21} - v_{b21a22} - v_{a22b22} + v_b - v_{bx1} = 0 \quad (3)$$

For phases b-c:

$$v_{bx1} - v_b - v_{b22c22} - v_{c22b23} - v_{b23c23} + v_c - v_{cx1} = 0 \quad (4)$$

For phases c-a:

$$v_{cx1} - v_c - v_{c23a23} - v_{a23c21} - v_{c21a21} + v_a - v_{ax1} = 0 \quad (5)$$

where:
$v_{ax1} = v_{a1}$, $v_{bx1} = v_{b1}$, and $v_{cx1} = v_{c1}$
Therefore:

$$v_{ab} = (v_{a1} - v_{b1}) - v_{a21b21} - v_{b21a22} - v_{a22b22}$$

$$v_{bc} = (v_{b1} - v_{c1}) - v_{b22c22} - v_{c22b23} - v_{b23c23}$$

$$v_{ca} = (v_{c1} - v_{a1}) - v_{c23a23} - v_{a23c21} - v_{c21a21}. \quad (6)$$

In the ideal case, the voltages across the coupling inductors in the lower configuration can be neglected. Therefore:

$$v_{ab} = (v_{a1} - v_{b1}) - (v_{a2} - v_{b2})$$

$$v_{bc} = (v_{b1} - v_{c1}) - (v_{b2} - v_{c2})$$

$$v_{ca} = (v_{c1} - v_{a1}) - (v_{c2} - v_{a2}) \quad (7)$$

Second, the analysis of the line-to-line voltage of the circuits at the secondary side of the open-end winding transformers follows. Applying Kirchhoff voltage law in the secondary circuit, the line-line voltages is given as:

$$U_{AB} = (j\omega L_s)i_A + v_{sAB} - (j\omega L_s)i_B$$

$$U_{BC} = (j\omega L_s)i_B + v_{sBC} - (j\omega L_s)i_C$$

$$U_{CA} = (j\omega L_s)i_C + v_{sCA} - (j\omega L_s)i_A, \quad (8)$$

where:

$$v_{sAB} = v_{sA} - v_{sB}$$

$$v_{sBC} = v_{sB} - v_{sC}$$

$$v_{sCA} = v_{sC} - v_{sA} \quad (9)$$

and $$v_{sA} = \sqrt{2}\,V \sin \omega t$$

$$v_{sB} = \sqrt{2}\,V \sin(\omega t - 120°)$$

$$v_{sC} = \sqrt{2}\,V \sin(\omega t + 120°) \quad (10)$$

where V is the RMS phase voltages of the grid, and ω is the frequency of the voltage in radians, $i_A$ is the current injected to the grid, phase a, $i_B$ is the current injected to the grid, phase b, and $i_C$ is the current injected to the grid, phase c.

In order to obtain the current equations of the system, subtracting $v_{ab}$ from $v_{bc}$ in (6), one gets:

$$(v_{ca} - v_{ab}) - (v_{c1} - v_{a1}) + (v_{a1} - v_{b1}) + V_{AA} = v_{b21a22} - v_{a23c21}$$

$$(v_{ab} - v_{bc}) - (v_{a1} - v_{b1}) + (v_{b1} - v_{c1}) + V_{BB} = v_{c22b23} - v_{b21a22}$$

$$(v_{ca} - v_{ab}) - (v_{c1} - v_{a1}) + (v_{a1} - v_{b1}) + V_{CC} = v_{b21a22} - v_{a23c21} \quad (11)$$

where:

$$V_{AA} = (v_{c23a22} + v_{c21a21}) - (v_{a21b21} + v_{a22b22})$$

$$V_{BB} = (v_{a21b21} + v_{a22b22}) - (v_{b22c22} + v_{b23c23})$$

$$V_{CC} = (v_{b22c22} + v_{b23c23}) - (v_{c23a23} + v_{c21a21}). \quad (12)$$

The phase currents flow through the primary windings of the open-end winding transformers are given by:

$$\begin{bmatrix} i_{a1} \\ i_{b1} \\ i_{c1} \end{bmatrix} = - \begin{bmatrix} i_{a21} \\ i_{b21} \\ i_{c21} \end{bmatrix} = \begin{bmatrix} i_a \\ i_b \\ i_c \end{bmatrix} \quad (13)$$

On the other hand, the phase currents of the VSC in the lower part of FIG. 8 satisfy the following equations:

$$\begin{bmatrix} i_{a21} + i_{b21} + i_{c21} \\ i_{a22} + i_{b22} + i_{c22} \\ i_{a23} + i_{b23} + i_{c23} \end{bmatrix} = 0. \quad (14)$$

In addition, the current inside the voltage source inverter of the lower part in FIG. 8 have the following relationships:

$$\begin{bmatrix} i_{b21} \\ i_{c22} \\ i_{a23} \end{bmatrix} = - \begin{bmatrix} i_{a22} \\ i_{b23} \\ i_{c21} \end{bmatrix}. \quad (15)$$

From (14) and (15), we get:

$$i_{a21} = -i_a = (i_{b21} - i_{a23})$$

$$i_{b22} = -i_b = (i_{c22} - i_{b21})$$

$$i_{c23} = -i_c = (i_{a23} - i_{c22}). \quad (16)$$

Modifying (11) and (22) can get the following:

$$(v_{ca} - v_{ab}) - (v_{c1} - v_{a1}) + (v_{a1} - v_{b1}) + V_{AA} = L_h \frac{d(-i_a)}{dt} \quad (17)$$

$$= -j\omega L_h(i_a).$$

Therefore:

$$i_a = -\frac{(v_{ca} - v_{ab}) - (v_{c1} - v_{a1}) + (v_{a1} - v_{b1}) + V_{AA}}{j\omega L_h} \quad (18)$$

-continued $$i_b = -\frac{(v_{ab} - v_{bc}) - (v_{a1} - v_{b1}) + (v_{b1} - v_{c1}) + V_{BB}}{j\omega L_h}$$

$$i_c = -\frac{(v_{ca} - v_{ab}) - (v_{c1} - v_{a1}) + (v_{a1} - v_{b1}) + V_{CC}}{j\omega L_h}.$$

Equation (18) defines the phase currents injected into the grid. In addition, the phase currents in the lower part can be defined as:

$$i_{b21} = \frac{i_a - i_b + \frac{v_{b21c21} + v_{a23b23} + v_{c22a22}}{j\omega L_h}}{3} \quad (19)$$

$$i_{c22} = \frac{i_b - i_c + \frac{v_{b21c21} + v_{a23b23} + v_{c22a22}}{j\omega L_h}}{3}$$

$$i_{a23} = \frac{i_c - i_a + \frac{v_{b21c21} + v_{a23b23} + v_{c22a22}}{j\omega L_h}}{3},$$

where $i_a$, $i_b$, and $i_c$ are the phase currents of phases a, b, and c, respectively, and their values could be obtained from (18).

Figure 13:
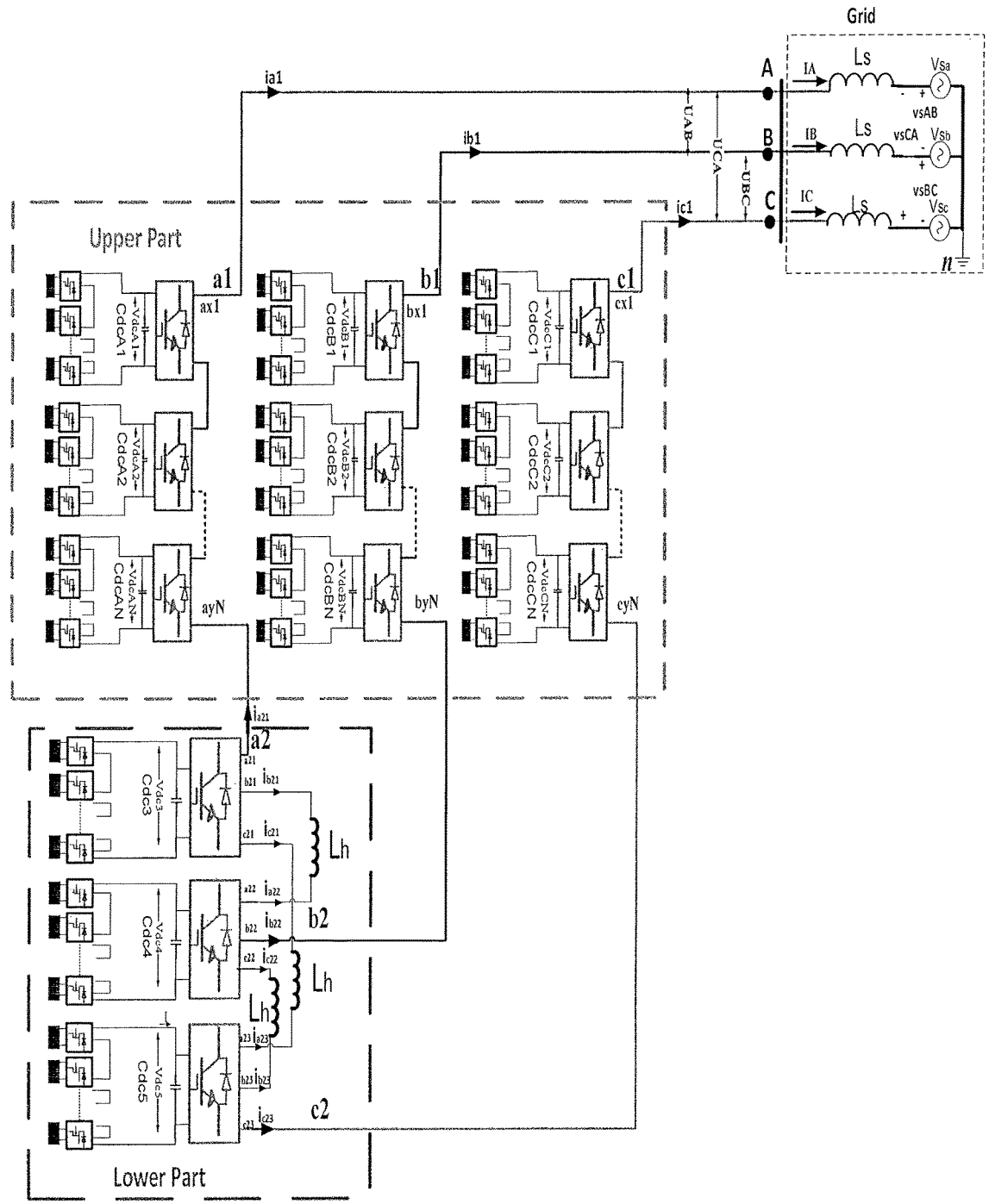
FIG. 13 is a schematic diagram of an embodiment of a hybrid CHB-TVSI multilevel voltage source inverter according to the present disclosure having a direct connection.

Single-phase line frequency transformers corresponding to a polyphase configuration are used. In the case of a three-phase architecture, three single-phase line frequency transformers presented in the disclosure are used to connect the upper cascaded H-bridge MLI with the lower three-phase cascaded voltage source inverter (triple voltage source inverter) by means of the open-end winding principle. The line frequency transformers are operating based on the principle of the open-end winding. An alternative approach can be made without using line frequency transformers, as shown in FIG. 13. Instead of connecting the terminals $a_{yN}$, $b_{yN}$ and $c_{yN}$ of the upper part together to one point (NN), the neutral of each phase in the cascaded H-bridge units (upper part) is directly connected to the corresponding phase in the three-phase triple VSI (lower part). That is, the neutral of phase a, $a_{yN}$ terminal, of the cascaded H-bridge part (upper part) is directly connected to the phase a, $a_{21}$ terminal, of the three-phase triple VSI (lower part). In addition, the neutral of phase b, $b_{yN}$ terminal, of the cascaded H-bridge part is directly connected to the phase b, $b_{22}$ terminal, of the three-phase triple VSI part. In addition, the neutral of phase c, $c_{yN}$ terminal, of the cascaded H-bridge part is directly connected to the phase c, $c_{23}$ terminal, of the three-phase triple VSI part.

Therefore, in a general view, the three-phase direct-connection topology comprises N H-bridge units cascaded and directly connected to the three-phase two level voltage source inverter units, which are also cascaded. The three terminals $a_1$, $b_1$, and $c_1$ of phases a, b, and c of the direct-connection topology are then directly connected to the three-phase grid with using a lower number of components count when compared with the conventional multilevel inverter topologies to generate the same voltage level. In addition, no line frequency transformers are used in this direct-connection topology. This will reduce the total cost of the system and eliminate the drawback of the line frequency transformers. Therefore, in order to obtain an isolation in the direct connection topology; an isolated DC-DC converter can be used instead.

The line-to-line voltages of the direct-connection inverter are:

$$U_{AB} = (v_{a1} - v_{b1}) + v_{a21b21} + v_{b21a22} + v_{a22b22}$$

$$U_{BC} = (v_{b1} - v_{c1}) + v_{b22c22} + v_{c22b23} + v_{b23c23}$$

$$U_{CA} = (v_{c1} - v_{a1}) + v_{c23a23} + v_{a23c21} + v_{c21a21}. \quad (20)$$

The line-to-line voltages at the grid side are:

$$v_{sAB} = U_{AB} - (j\omega L_s)i_A + (j\omega L_s)i_B$$

$$v_{sBC} = U_{BC} - (j\omega L_s)i_B + (j\omega L_s)i_C$$

$$v_{sCA} = U_{CA} - (j\omega L_s)i_C + (j\omega L_s)i_A, \quad (21)$$

where:

$$v_{sAB} = v_{sA} - v_{sB}$$

$$v_{sBC} = v_{sB} - v_{sC}$$

$$v_{sCA} = v_{sC} - v_{sA}. \quad (22)$$

and
$v_{sA} = \sqrt{2}V \sin \omega t$, $v_{sB} = \sqrt{2}Vs \sin(\omega t - 120°)$, $v_{sC} = \sqrt{2}V \sin(\omega t + 120°)$, where V is the RMS phase voltages of the grid, and $\omega$ is the frequency of the voltage in radians; $i_A$ is the current injected to the grid, phase a; $i_B$ is the current injected to the grid, phase b; and $i_C$ is the current injected to the grid, phase c.

The three phase currents of the direct-connection topology can be written as:

$$i_a = \frac{(v_{ca} - v_{ab}) - (v_{c1} - v_{a1}) + (v_{a1} - v_{b1}) - V_{AA}}{j\omega L_h} \quad (23)$$

$$i_b = \frac{(v_{ab} - v_{bc}) - (v_{a1} - v_{b1}) + (v_{b1} - v_{c1}) - V_{BB}}{j\omega L_h}$$

$$i_c = \frac{(v_{ca} - v_{ab}) - (v_{c1} - v_{a1}) + (v_{a1} - v_{b1}) - V_{CC}}{j\omega L_h},$$

where: $V_{AA}$, $V_{BB}$ and $V_{CC}$ are explained in equation (12). Equations (23) define the phase currents injected into the grid.

In addition, the phase currents in the lower configuration can be defined as:

$$i_{b21} = \frac{i_b - i_a + \frac{v_{b21c21} + v_{a23b23} + v_{c22a22}}{j\omega L_h}}{3} \quad (24)$$

$$i_{c22} = \frac{i_c - i_b + \frac{v_{b21c21} + v_{a23b23} + v_{c22a22}}{j\omega L_h}}{3}$$

$$i_{a23} = \frac{i_a - i_c + \frac{v_{b21c21} + v_{a23b23} + v_{c22a22}}{j\omega L_h}}{3}.$$

Figure 14:
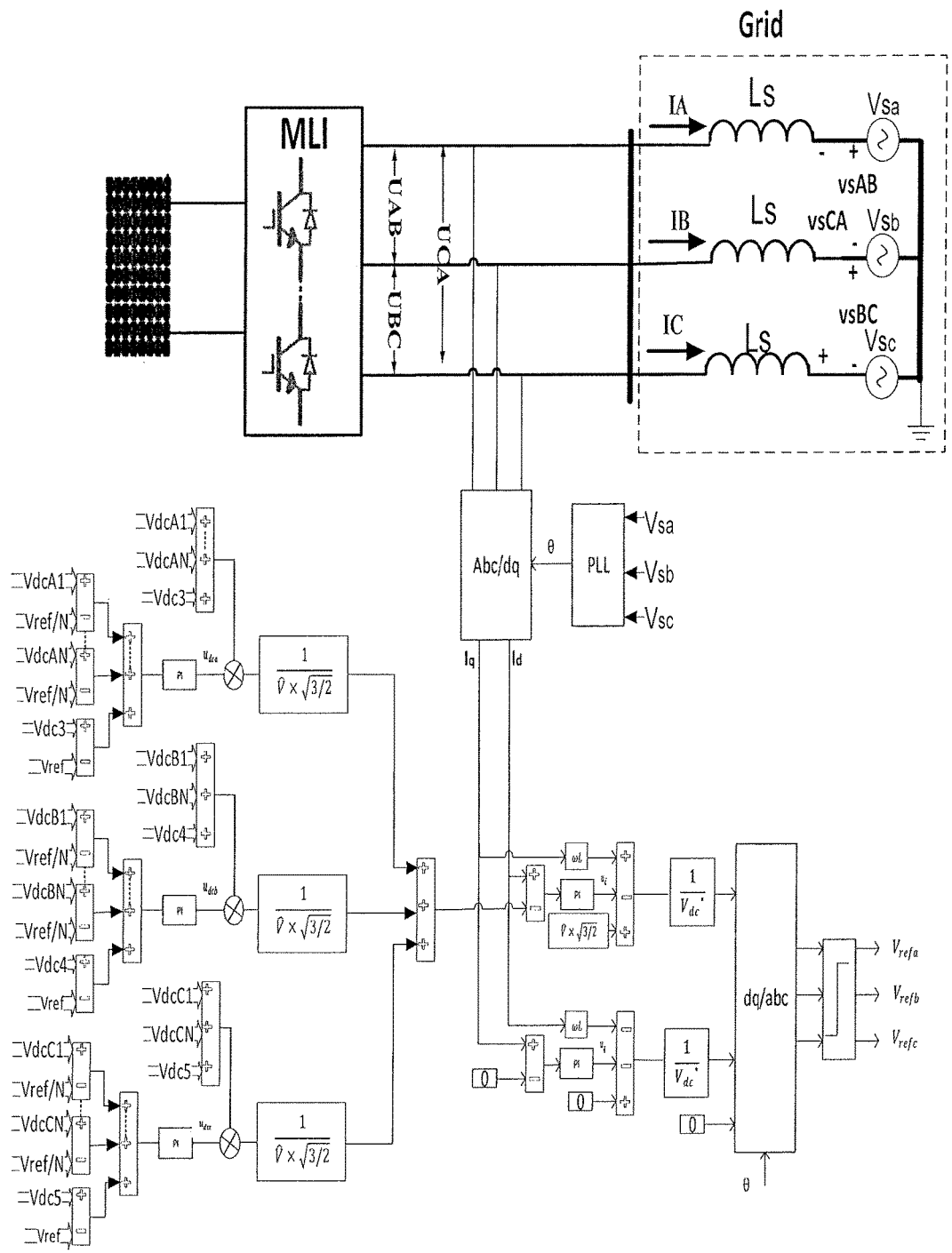
FIG. 14 is a schematic diagram of a control scheme for a hybrid CHB-TVSI multilevel voltage source inverter according to the present disclosure.

In the DC side control, the DC-DC converter shown in FIG. 10 is used for tracking the maximum power of the PV module. The main aim of the inverter controller is to generate reference currents in the synchronous frame such that the hybrid CHB-TVSI provides only available active power at the DC links to the grid with zero reactive power to guarantee unity power factor. The inverter control scheme has been extended to control the disclosed multilevel inverter. The disclosed control scheme is shown in FIGS. 13 and 14. The DC voltage across the capacitors $C_{dc1}$, $C_{dc2}, \ldots, C_{dcN}$ in each phase in the upper configuration is measured and compared with the reference voltage. In addition, the voltage across $C_{dc3}$, $C_{dc4}$ and $C_{dc5}$ of the three units in the lower configuration is measured and compared with the reference voltage Vref The reference voltage of each H-bridge unit is assumed to be Vref/N, where N is the number of H-bridge cells, which are cascaded in each phase, and Vref is the reference voltage of each VSI unit in the lower configuration.

The DC links $C_{dcA1}, C_{dcA2}, \ldots, C_{dcAN}$ and $C_{dc3}$ share the same active grid current of phase a. On the other hand, the DC links $C_{dcB1}, C_{dcB2}, \ldots, C_{dcBN}$ and $C_{dc4}$ share the same active grid current of phase b. In addition, the DC links $C_{dcC1}, C_{dcC2}, \ldots, C_{dcCN}$ and $C_{dc5}$ share the same active grid current of phase c. Therefore, the comparison error signal of voltages across DC links $C_{dcA1}, C_{dcA2}, \ldots, C_{dcAN}$ and $C_{dc3}$ with their respective reference voltages are summed and then passed to one PI (proportional integral) voltage controller. The result signal is $u_{dca}$. In addition, the result signal from comparison of the voltages across DC links of phases b and c with their respective reference voltages are $u_{dcb}$ and $u_{dcc}$, respectively.

The modeling technique is based on Kirchhoff's law of the MLI in the abc frame, so that one gets:

$$v_{sA} = (j\omega L_s)i_A + V_{Am} + V_{mn}$$

$$v_{sB} = (j\omega L_s)i_B + V_{Bm} + V_{mn}$$

$$v_{sC} = (j\omega L_s)i_C + V_{Cm} + V_{mn}, \qquad (25)$$

where the point (m) is a virtual ground of the hybrid CHB-TVSI, while $V_{mn}$ is the voltage between the ground of the inverter (m) and the neutral of the grid (n).

Assuming that the voltages of the grid are balanced and therefore no zero sequence component exists, the voltage $V_{mn}$ between the ground of the hybrid CHB-TVSI (m) and the neutral of the grid (n) is given as:

$$V_{mn} = -\frac{V_{Am} + V_{Bm} + V_{Cm}}{3}. \qquad (26)$$

On the other hand, the switching function $C_K$ of the inverter can be given as:

$$\begin{bmatrix} V_{Am} \\ V_{Bm} \\ V_{Cm} \end{bmatrix} = \begin{bmatrix} C_A \\ C_B \\ C_C \end{bmatrix} [V_{dcA} \quad V_{dcB} \quad V_{dcC}], \qquad (27)$$

where $V_{dcA}$ is the equivalent DC voltage across the DC link capacitors $C_{dcA1}, C_{dcA2}, \ldots, C_{dcAN}$ and $C_{dc3}$ in the hybrid CHB-TVSI topology.

In addition, $V_{dcB}$ is the equivalent DC voltage across the DC link capacitors $C_{dcB}, C_{dcB2}, \ldots, C_{dcBN}$ and $C_{dc4}$, while $V_{dcC}$ is the equivalent DC voltage across the DC link capacitors $C_{dcC1}, C_{dcC2}, \ldots, C_{dcCN}$ and $C_{dc5}$.

Assuming that the control system accurately regulates the DC link voltages, then:

$$V_{dcA} = V_{dcB} = V_{dcC} = V_{dctot} \qquad (28)$$

Equation (28) can be written as:

$$\begin{bmatrix} V_{Am} \\ V_{Bm} \\ V_{Cm} \end{bmatrix} = \begin{bmatrix} C_A \\ C_B \\ C_C \end{bmatrix} V_{dctot}. \qquad (29)$$

Substituting (29) into (26), one gets:

$$V_{mn} = -\frac{1}{3}(C_A + C_B + C_C)V_{dctot}. \qquad (30)$$

Replacing (29) and (30) in to (25), one gets:

$$v_{sA} = (j\omega L_s)i_A + d_{nA}V_{dctot}$$

$$v_{sB} = (j\omega L_s)i_B + d_{nB}V_{dctot}$$

$$v_{sC} = (j\omega L_s)i_C + d_{nC}V_{dctot} \qquad (31)$$

where $d_{nX}$ is defined as the sequential function and is given by:

$$\begin{bmatrix} d_{nA} \\ d_{nA} \\ d_{nA} \end{bmatrix} = \begin{bmatrix} C_A \\ C_B \\ C_C \end{bmatrix} - \frac{1}{3}(C_A + C_B + C_C). \qquad (32)$$

As seen, the MLI model is time-varying and nonlinear. A transformation of the model in the synchronous stationary frame is used to facilitate inverter control. In order to obtain synchronous control, the three-phase grid currents and grid voltages are transformed into the dq frame. Equation (31) can be written in the dq frame, and it is given as:

$$V_d = L_s \frac{di_d}{dt} - (\omega L_s)i_q + d_{nd}V_{dctot} \qquad (33)$$

$$V_q = L_s \frac{di_q}{dt} + (\omega L_s)i_d + d_{nq}V_{dctot}.$$

The DC current can be defined as:

$$C_{dc}\frac{dV_{dctot}}{dt} = d_{nd}i_d + d_{nq}i_q. \qquad (34)$$

A new equivalent model can be introduced to analyze the nonlinearity problems. These inputs may be written as:

$$u_d = (j\omega L_s)i_q - d_{nd}V_{dctot} + V_d$$

$$u_q = -(j\omega L_s)i_d - d_{nq}V_{dctot} + V_q. \qquad (35)$$

As stated above, the active current $i_d$ is responsible to regulate the DC link voltages and compensates for losses in the dissipative elements of the inverter. In addition, the reactive current $i_q$ should be set to zero to guarantee unity power factor. Therefore, equation (34) can be written as:

$$u_{dc} = C_{dc}\frac{dV_{dctot}}{dt} = d_{nd}i_d \qquad (36)$$

$$i_d = \frac{u_{dc}}{d_{nd}}. \qquad (37)$$

In normal operation and under accurate current loop control, the following properties apply:

$$V_d \approx d_{nd}V_{dctot} = d_{nd}V_{dctot} = \sqrt{\frac{3}{2}}V_{max}, \quad (38)$$

where $V_{max}$ is the maximum grid voltage. Replacing (38) into (37), one gets:

$$i_d = \sqrt{\frac{2}{3}}\frac{u_{dc}}{V_{max}}V_{dctot}. \quad (39)$$

This $i_d$ current is the active current, which is responsible to regulate the DC link capacitors, e.g., Cdc1a, Cdc2a and Cdc3. Therefore, it can be written as:

$$i_{da} = \sqrt{\frac{2}{3}}\frac{u_{dcA}}{V_{max}}V_{dcA}. \quad (40)$$

The reference active current of the grid is the sum of the three id active currents:

$$i_{dref} = i_{da} + i_{db} + i_{dc} \quad (41)$$

$$= \sqrt{\frac{2}{3}}\frac{u_{dca}}{V_{max}}V_{dcA} + \sqrt{\frac{2}{3}}\frac{u_{dcb}}{V_{max}}V_{dcB} + \sqrt{\frac{2}{3}}\frac{u_{dcc}}{V_{max}}V_{dcC}.$$

Figure 15:
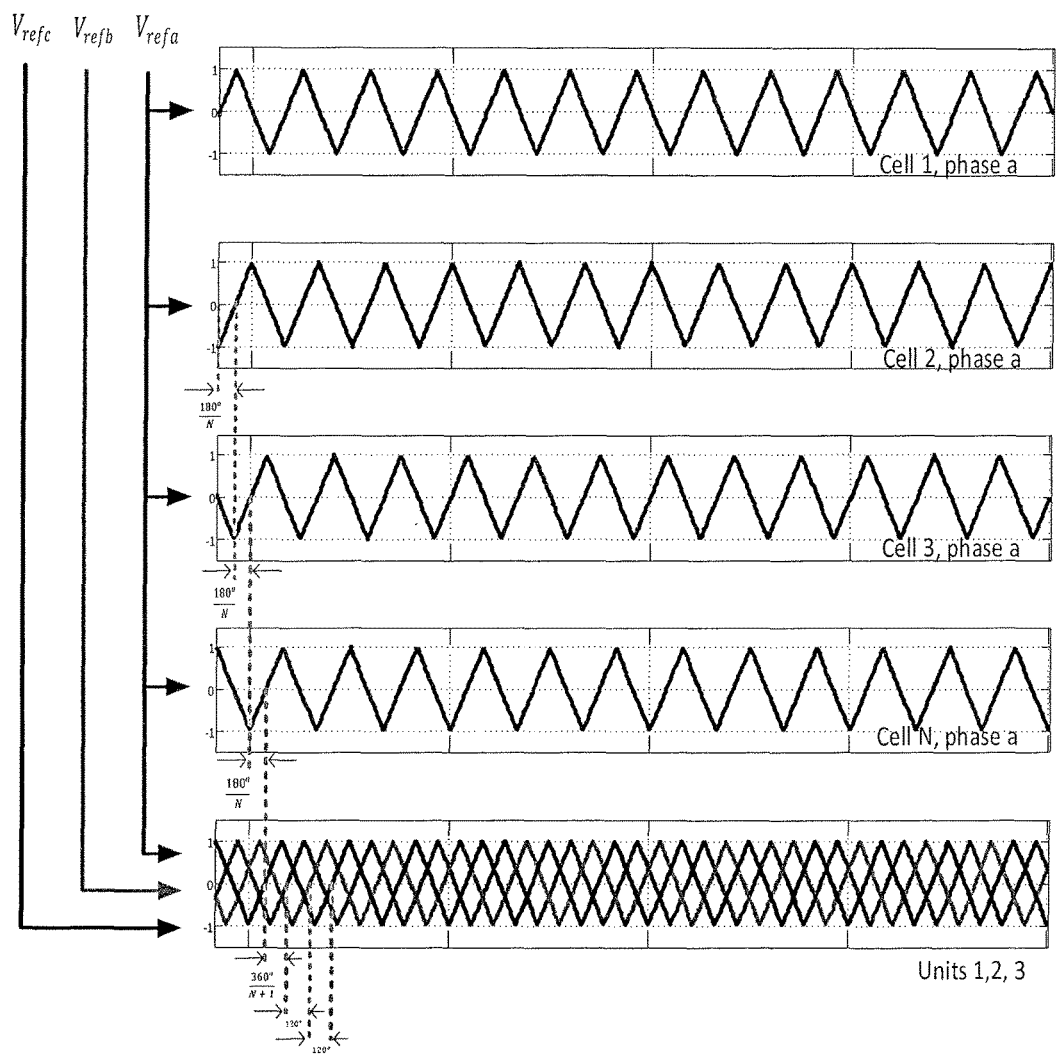
FIG. 15 is a waveform diagram showing the modulation signals for a hybrid CHB-TVSI multilevel voltage source inverter according to the present disclosure.

The disclosed control scheme based on the analysis above is shown in FIG. 14. The reference active current of the grid $i_{dref}$ is compared with the actual active grid current $i_d$. On the other hand, the reference reactive current of the grid ($i_{qref}$=0) is compared with the actual reactive grid current $i_q$. The resulting signals, $d_{nd}$ and $d_{nq}$, obtained from equation (35), are transformed into abc reference voltage signals ($V_{refa}$, $V_{refb}$, and $V_{refc}$). These signals are then used to generate switching pulses to drive the IGBTs of the hybrid CHB-TVSI topology by comparing them with the generated triangular carrier waveforms. FIG. 15 is a graphical depiction, showing the modulation signals. As shown in this figure, the phase shift technique is used to generate the pulses to drive IGBTs of the cascaded H-bridge part (upper part), since the triangular signal of the next H-bridge cell is shifted from the previous H-bridge cell by 180/N, where N is the number of H-bridge cells. The reference voltage signal, $V_{refa}$, is compared with these phase-shifted triangular waveforms, and the resulting pulses are used to drive IGBTs of the H-bridge cells of phase a. On the other hand, the reference voltage signals $V_{refb}$ and $V_{refc}$ are also compared with the phase-shifted triangular waveforms to drive IGBTs of the H-bridge cells of phases b and c, respectively, of the upper part. Only the phase-shifted triangular waveforms used to drive IGBTs of H-bridge cells of phase a (phase a in the upper part) are shown in FIG. 15. In addition, in order to drive IGBTs of the three-phase triple VSI (lower part) in the hybrid CHB-TVSI topology, the reference voltage signals $V_{refa}$, $V_{refb}$, and $V_{refc}$ are compared with the phase-shifted triangular waveforms, as shown in FIG. 15. The triangular signal used to generated PWM pulses of unit 2 is shifted by (T/3) from that of unit 1, and the triangular signal used to generate PWM pulses of unit 3 is shifted by (T/3) from that of unit 2. It is noted that the generated triangular waveforms of the lower part are shifted from the last triangular signal of H-bridge cell number N in the upper part by (T/(N+1)), where N is the number of H-bridge cells in the upper part of the hybrid CHB-TVSI topology.

Simulation was carried out by MATLAB/SIMULINK software to validate the disclosed topology, as well as the direct connection topology. The system comprises 24 HIT-N220A01 PV modules. Twelve PV modules are connected to the upper part of the hybrid CHB-TVSI topology. For simplicity, only two H-bridge cells are used per phase in the upper part. The other twelve PV modules are connected to the lower part of the hybrid CHB-TVSI topology. The system parameters are shown in Table 1.

TABLE 1

| System Parameters | |
| --- | --- |
| DC-Link Capacitor | 4 mF |
| Connection Inductor LF | 5 mH |
| Limiting inductor in the lower conf. | 0.5 mH |
| DC-DC converter switching Frequency fs | 40 KHz |
| Inverter Switching Frequency $f_{inv}$ | 4 KHz |
| Per Phase Grid rated RMS Voltage | 130 V |
| Reference Voltage | 88 V |

Figure 16:
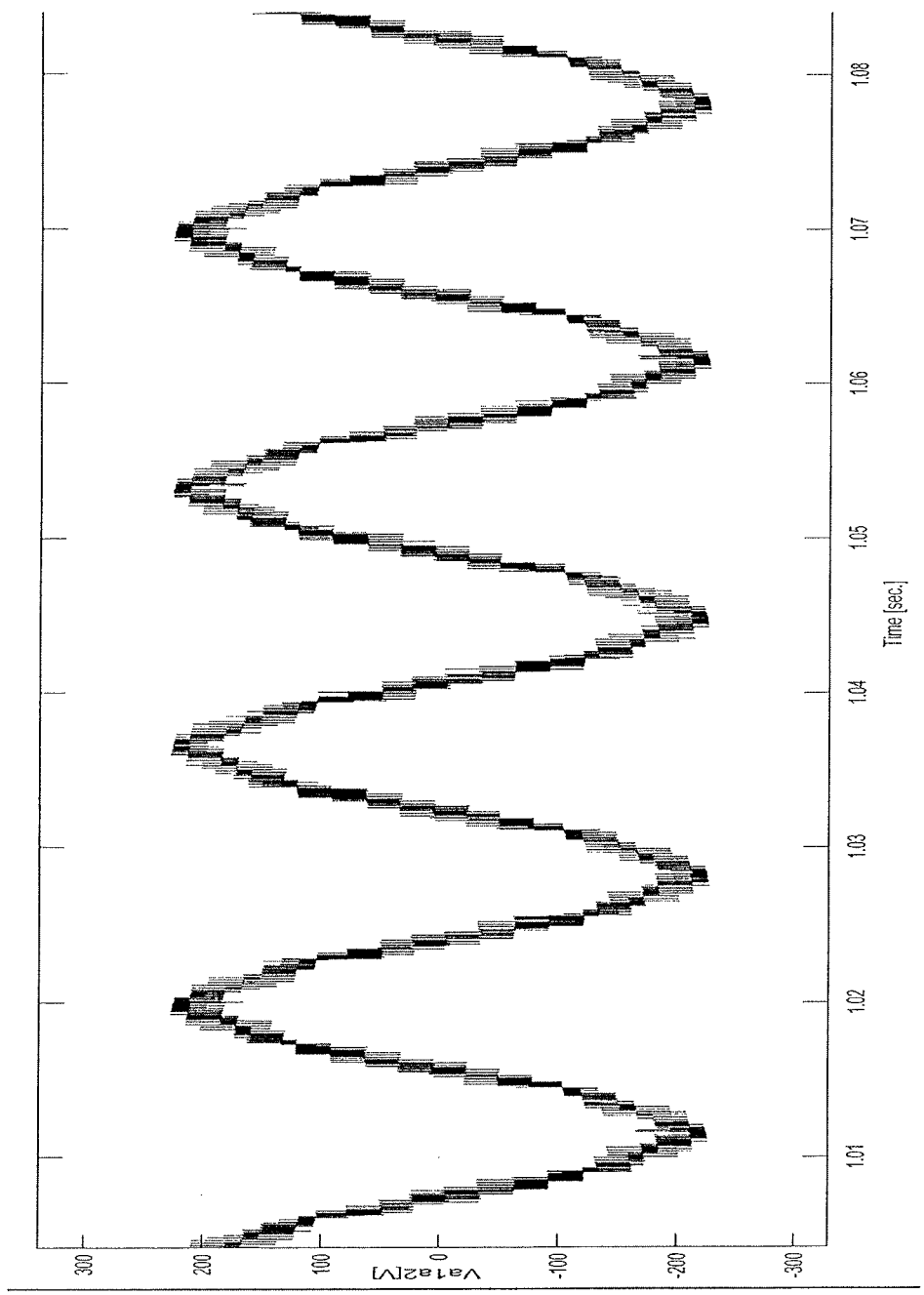
FIG. 16 is a plot of the multilevel voltage generated across the primary side of transformer T1, $v_{a1a2}$, in phase a of the hybrid CHB-TVSI multilevel voltage source inverter of FIG. 8.

FIG. 16 is a graphical depiction, showing the multilevel voltage generated across the primary side of transformer T1, va1a2, in phase a. The figure depicts the multilevel voltage generated from phase (a) in the disclosed topology. This voltage is measured across the two primary terminals of the transformer, which are the $a_1$ and $a_2$ terminals. This voltage can be obtained as:

$$v_a = v_{a1\_a2} = v_{a1} - v_{a2}. \quad (42)$$

The number of voltage levels generated from the disclosed topologies can be given as:

$$M = (2(2N+1)-1), \quad (43)$$

where M is the number of voltage levels generated, and N=(total number of cascaded H-bridge cells of the upper part+3 units of the lower part). According to equation (43), the total number of voltage levels generated from the disclosed topologies is 21 levels.

As shown in FIG. 16, the number of levels generated is about 21 levels, and the THD of the $v_{a1\_a2}$ is only 13.59%. This result justifies the disclosed configuration, since a large number of voltage levels is generated with a significantly low THD.

Figure 17:
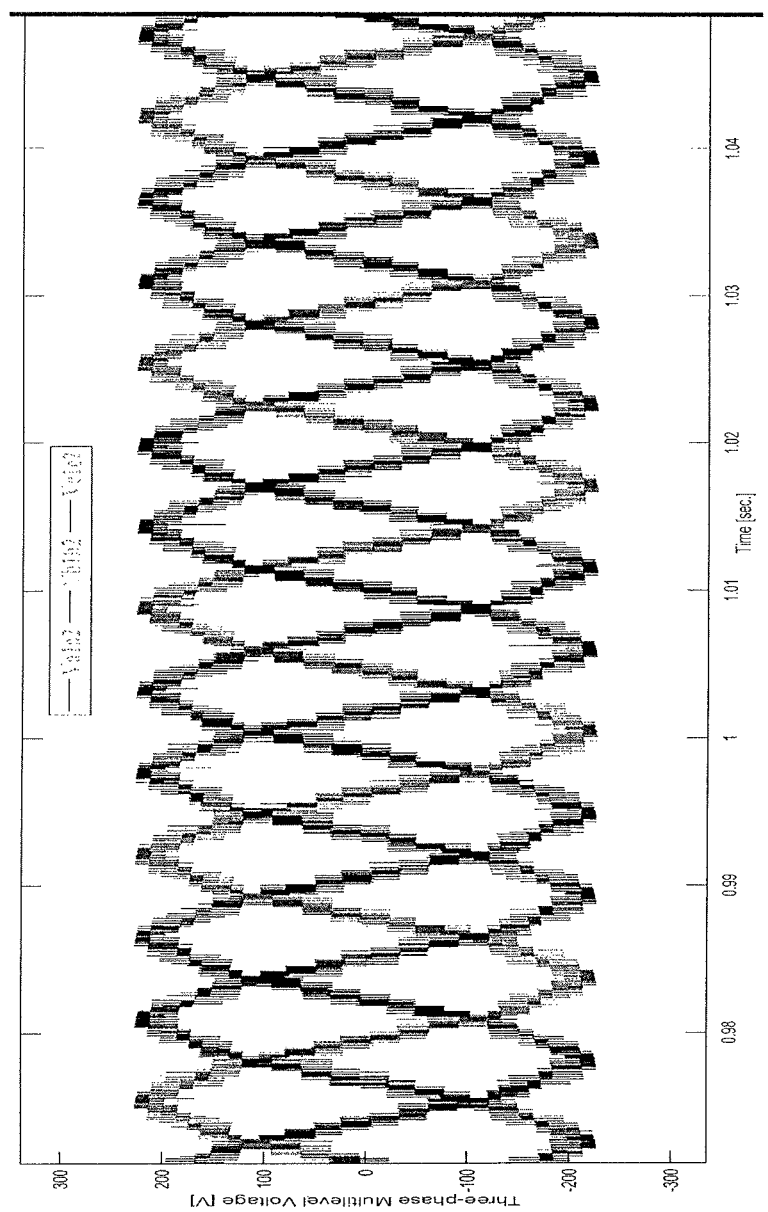
FIG. 17 is a plot of the three-phase voltages generated by the disclosed topology across the primary sides of the transformers T1, T2 and T3 of the hybrid CHB-TVSI multilevel voltage source inverter of FIG. 8.
Figure 18:
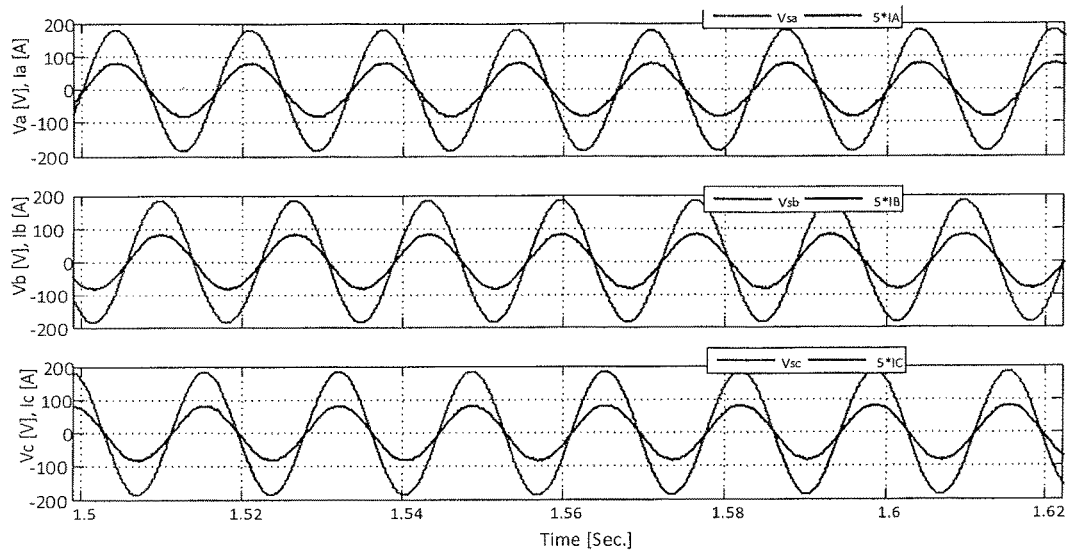
FIG. 18 is a waveform diagram of the three-phase grid voltages and currents of the hybrid CHB-TVSI multilevel voltage source inverter of FIG. 8.
Figure 19:
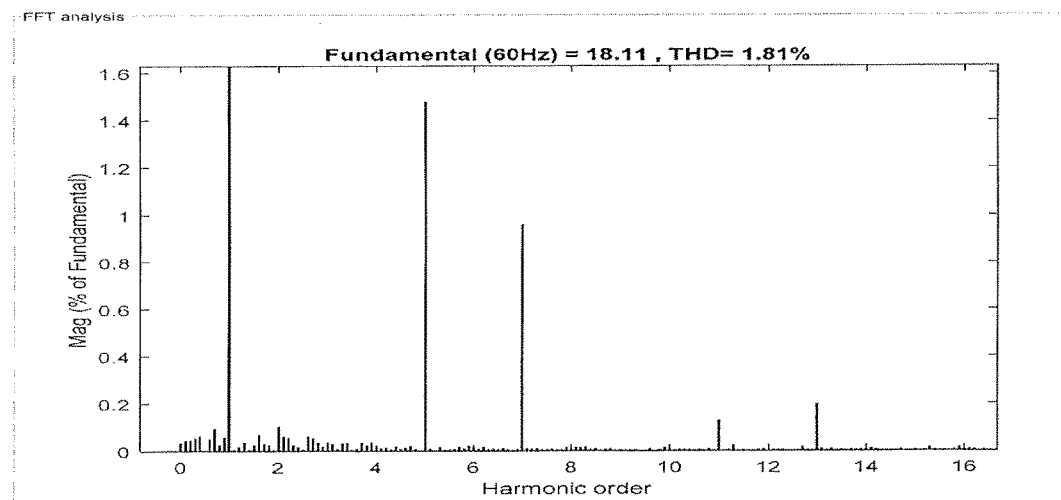
FIG. 19 is a plot of THD of the grid current, phase a, of the hybrid CHB-TVSI multilevel voltage source inverter of FIG. 8.

FIG. 17 is a plot of the three-phase voltages generated by the disclosed topology across the primary sides of the transformers T1, T2 and T3. The three-phase grid voltages and grid currents are shown in FIG. 18. As shown in this figure, the disclosed control technique succeeds in keeping the three-phase grid current balanced. It should be noted that the grid currents and grid voltages are approximately in phase and the power factor is kept unity. The THD of each grid current is only 1.81%, which is much less than 5% and meets power quality standards, as shown in FIG. 19.

Figure 20:
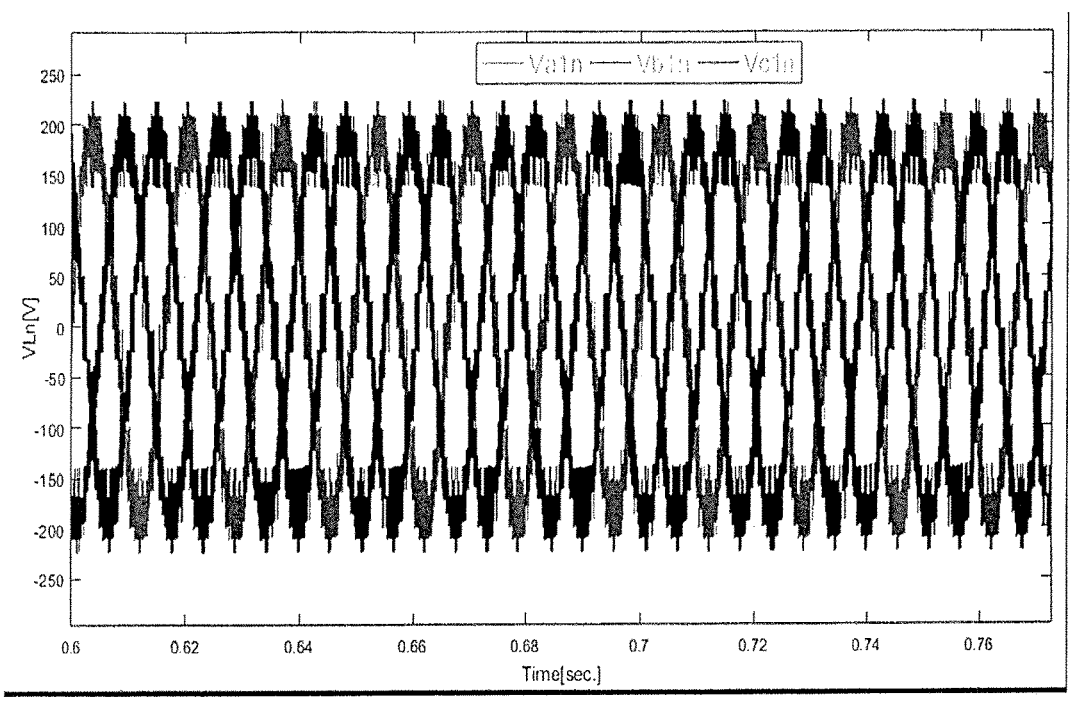
FIG. 20 is a plot of the three-phase voltages generated by the direct-connection topology of the hybrid CHB-TVSI multilevel voltage source inverter of FIG. 13.

On the other hand, the same control scheme shown in FIG. 14 is applied to the direct-connection topology to generate multilevel voltage. FIG. 20 is the generated three-phase voltage (line-to-neutral) from the direct-connection topology. The number of voltage levels generated is also 21 levels. The number of voltage levels generated for the direct-connection topology can also be obtained from equation (43).

A comparison of the disclosed topologies with the prior art multilevel inverter topologies to generate 21 voltage levels is shown in Table 2.

TABLE 2

Topology Comparison

|  | NPC | FC | CHB | MMC | Disclosed topologies (hybrid CHB-TVS) |
|---|---|---|---|---|---|
| No. Of Switches | 120 | 120 | 120 | 240 | 42 |
| DC-link Capacitors | 20 | 20 | 30 | 80 | 9 |
| No. Of Inductors | 0 | 0 | 0 | 6 | 3 |
| No. Of Diodes | 1140 | 0 | 0 | 0 | 0 |
| No. Of Flying Capacitors | 0 | 570 | 0 | 0 | 0 |
| Reliability | Low | Low | High | Low | High |
| Modularity | No | No | Yes | No | Yes |
| Voltage Balancing Problem | Yes | Yes | No | Yes | No |

As shown in Table 2, the disclosed topologies have the least number of switches compared to the prior art MLI topologies (Neutral Point Converter (NPC), Flying Capacitor MLI (FC), Cascaded H-bridge MLI (CHB), and Modular Multilevel Converter (MMC)). In addition, the reliability of the disclosed topologies is higher, with higher modularity. On the other hand, the disclosed topologies have the fewest number of DC-link capacitors, which increase the reliability.

It is to be understood that the hybrid CHB-TVSI multilevel voltage source inverter is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A hybrid CHB-TVSI multilevel voltage source inverter, comprising:
a set of output transformers providing output power in three phases adapted for connection to a grid;
an upper part including a cascaded H-bridge multilevel inverter having:
three phases of H-bridge cells having pairs of x-side and y-side switched intermediate outputs, the H-bridge cells being cascaded such that a terminal between the y-side switched intermediate output on one side of a first H-bridge cell connects with a terminal between the x-side switched intermediate output of a second H-bridge cell, and a terminal between the x-side switched intermediate output on one side of the second H-bridge cell connects with a terminal between the x-side switched intermediate output of the next H-bridge cell, each of the H-bridge cells being connected to at least one DC power source, the H-bridge cells having a first set of outputs connected to each other and a second set of outputs providing output power to a first set of primary winding connections on respective phases of the set of output transformers; and
a lower part including a three-phase voltage source inverter having:
three units connected in cascade, each of the three units being configured as a three-leg, two-level inverter and having three output terminals, two of the other output terminals of the three units in the lower part being connected through inductors to respective ones of the output terminals of the other two units, one of the three output terminals of the units in the lower part being connected to a second set of primary winding connections on the respective phases of the set of output transformers, each of the three units being connected to at least one DC power source; and
wherein connections of the upper and lower parts to the set of output transformers connect respective phases of the upper part to corresponding phases of the lower part; and
wherein the set of output transformers connects the upper part with the lower part using a three-phase open-end winding configuration.

2. The hybrid CHB-TVSI multilevel voltage source inverter according to claim 1, wherein the upper and lower parts provide a power output approximately twice a design power capacity of the x-side and y-side switched intermediate outputs.

3. The hybrid CHB-TVSI multilevel voltage source inverter according to claim 1, wherein the output power from the output transformers comprises a sinusoidal approximation power waveform.

4. A polyphase grid-connected multilevel inverter system providing a polyphase output, the inverter system comprising:
a set of output transformers providing output power in a number of phases corresponding to the polyphase output;
the inverter system having a lower part and an upper part, the upper part including:
a plurality of H-bridge cells corresponding to the polyphase output having pairs of x-side and y-side switched intermediate outputs, the H-bridge cells being cascaded such that a terminal between the x-side switched intermediate output on one side of a first H-bridge cell connects with a terminal between the y-side switched intermediate output of a next H-bridge cell, and a terminal between the y-side switched intermediate output on one side of the first H-bridge cell connects with a terminal between the x-side switched intermediate output of the next H-bridge cell;
the upper part of each of the plurality of H-bridge cells being connected to at least one DC power source, the at least one DC power source being connected to track a desired input voltage to feed the respective H-bridge cell to provide an optimum power point tracking (MPPT) of the at least one DC power source;
each of the plurality of H-bridge cells having a first set of outputs for connection to respective outputs of the lower part; and
each of the plurality of H-bridge cells having a second set of outputs providing output power to a polyphase grid; and
the lower part of the inverter system including:
a polyphase triple voltage source multilevel inverter having a plurality of units corresponding to the polyphase output, each of the plurality of units being configured as a polyphase leg two-level inverter and cascaded and each of the plurality of units having output terminals including a number of output terminals corresponding to the polyphase output;

two of the output terminals of the plurality of units in the lower part being connected through inductors to respective ones of the output terminals of the other units of the plurality of units;

one of the output terminals of the plurality of units in the lower part being connected to a third set of primary winding connections on the respective phases of the set of output transformers;

the plurality of units being connected to at least one DC power source; and a polyphase grid connected to the second set of outputs of the upper part, wherein the connections of the upper and lower parts provide connection of the respective phases of the upper part to corresponding phases of the lower part.

5. The polyphase grid-connected multilevel inverter system of claim 4, wherein the polyphase output comprises a three-phase output.

6. The polyphase grid-connected multilevel inverter system of claim 4, wherein the upper and lower parts provide a power output approximately twice a design power capacity of the x-side and y-side switched intermediate outputs.

7. The polyphase grid-connected multilevel inverter system of claim 4, wherein the output power from the output transformers comprises a sinusoidal approximation power waveform.

8. The polyphase grid-connected multilevel inverter system of claim 4, wherein the output power from the output transformers comprises a sinusoidal approximation power waveform, provided as a three-phase output.

9. A three-phase grid-connected multilevel inverter system for connection to at least one DC power source, comprising:

an upper part including:
three phases of H-bridge cells having pairs of x-side and y-side switched intermediate outputs, the three phases of H-bridge cells being cascaded such that a terminal between the x-side switched intermediate output on one side of a first H-bridge cell connects with a terminal between the y-side switched intermediate output of a next H-bridge cell, and a terminal between the y-side switched intermediate output on one side of the first H-bridge cell connects with a terminal between the x-side switched intermediate output of the next H-bridge cell;

the respective H-bridge cells upper part connected to the at least one DC power source; and the H-bridge cells having a second set of outputs providing output power in respective phases;

a lower part including:
a three-phase triple voltage source multilevel inverter including three units, each of the three units being configured as a three-leg, two-level inverter and cascaded, and each of the three units having three output terminals;

two of the output terminals of the three units in the lower part being connected through inductors to respective ones of the output terminals of the other units of the lower part;

one of the output terminals of the three units in the lower part being connected to respective phases of the set of output transformers;

each of the three units being connected to the at least one DC power source; and a three-phase grid connected to respective secondary winding connections of the H-bridge cells; and a three-phase output circuit receiving the second set of outputs;

wherein at least one of the connections to the at least one DC power source comprises a maximum power point tracking (MPPT) circuit capable of switching the at least one DC power source to achieve a maximum power point (MPP).

10. The three-phase grid-connected multilevel inverter system of claim 9, wherein the three-phase output circuit receiving the second set of outputs further comprises a set of output transformers.

11. The three-phase grid-connected multilevel inverter system of claim 9, wherein the the upper and lower parts provide a power output approximately twice a design power capacity of the x-side and y-side switched intermediate outputs.

12. The three-phase grid-connected multilevel inverter system of claim 9, wherein the output power comprises a sinusoidal approximation power waveform.

13. The three-phase grid-connected multilevel inverter system of claim 9, wherein the output power comprises a sinusoidal approximation power waveform, provided as a three-phase output.

* * * * *